United States Patent
Morishige et al.

(10) Patent No.: US 9,267,544 B2
(45) Date of Patent: Feb. 23, 2016

(54) THRUST SLIDING BEARING AND MOUNTING STRUCTURE OF A STRUT-TYPE SUSPENSION USING THE THRUST SLIDING BEARING

(71) Applicant: Oiles Corporation, Tokyo (JP)

(72) Inventors: Kouichi Morishige, Kanagawa (JP); Ryohei Kaneko, Kanagawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/257,133

(22) Filed: Apr. 21, 2014

(65) Prior Publication Data

US 2014/0225344 A1    Aug. 14, 2014

Related U.S. Application Data

(62) Division of application No. 13/977,241, filed as application No. PCT/JP2011/007110 on Dec. 20, 2011, now Pat. No. 8,740,233.

(30) Foreign Application Priority Data

Jan. 7, 2011   (JP) .................................. 2011-002510

(51) Int. Cl.
   *F16C 33/74*      (2006.01)
   *B60G 15/06*      (2006.01)
   *F16C 33/20*      (2006.01)
   *F16C 17/04*      (2006.01)
   *F16C 17/18*      (2006.01)

(52) U.S. Cl.
CPC .............. *F16C 33/74* (2013.01); *B60G 15/068* (2013.01); *F16C 17/04* (2013.01); *F16C 17/18* (2013.01); *F16C 33/20* (2013.01); *B60G 2204/128* (2013.01); *B60G 2204/418* (2013.01); *F16C 2326/05* (2013.01); *F16C 2361/53* (2013.01)

(58) Field of Classification Search
CPC ...... F16C 33/74; F16C 33/20; F16C 2326/05; B60G 15/068; B60G 2204/128
USPC .................... 280/124.155; 384/368, 420, 144
See application file for complete search history.

(56) References Cited

U.S. PATENT DOCUMENTS

| | | | |
|---|---|---|---|
| 5,476,326 A | 12/1995 | Ueno et al. | |
| 8,328,427 B2 * | 12/2012 | Kellam | 384/420 |
| 8,596,661 B2 | 12/2013 | Kaneko et al. | |
| 8,740,233 B2 * | 6/2014 | Morishige et al. | 280/124.155 |
| 2004/0028303 A1 * | 2/2004 | Ueno et al. | 384/276 |
| 2004/0240761 A1 | 12/2004 | Watai et al. | |
| 2006/0215944 A1 | 9/2006 | Watai et al. | |

(Continued)

FOREIGN PATENT DOCUMENTS

| | | | | |
|---|---|---|---|---|
| JP | 11-013768 | 1/1999 | | |
| JP | 2004-225754 | 8/2004 | | |
| WO | WO 2010/023882 | * | 3/2010 | ........... B60G 15/068 |

OTHER PUBLICATIONS

International Search Resort issued in PCT/JP2011/007110 dated Feb. 28, 2012.

*Primary Examiner* — Karen Beck
(74) *Attorney, Agent, or Firm* — Nixon & Vanderhye P.C.

(57) ABSTRACT

A thrust sliding bearing 1 includes a synthetic resin-made lower casing 2, a synthetic resin-made upper casing 3 superposed on the lower casing 2, and a synthetic resin-made thrust sliding bearing piece 4 interposed between said upper casing 3 and the lower casing 2.

1 Claim, 4 Drawing Sheets

(56) References Cited

U.S. PATENT DOCUMENTS

| | | |
|---|---|---|
| 2007/0237439 A1 | 10/2007 | Watai et al. |
| 2008/0310780 A1 | 12/2008 | Watai et al. |
| 2009/0180719 A1 | 7/2009 | Miyata et al. |
| 2010/0202716 A1 | 8/2010 | Kaneko |
| 2011/0194793 A1* | 8/2011 | Kaneko et al. .............. 384/368 |
| 2012/0027326 A1 | 2/2012 | Grantz et al. |
| 2012/0049428 A1 | 3/2012 | Moore et al. |
| 2013/0064489 A1 | 3/2013 | Corbett et al. |
| 2013/0270790 A1 | 10/2013 | Morishige et al. |
| 2013/0322798 A1 | 12/2013 | Morishige et al. |
| 2014/0010485 A1 | 1/2014 | Kaneko |

* cited by examiner

THRUST SLIDING BEARING AND MOUNTING STRUCTURE OF A STRUT-TYPE SUSPENSION USING THE THRUST SLIDING BEARING

This application is a divisional of application Ser. No. 13/977,241 filed Jun. 28, 2013, now allowed, which in turn is the US national phase of PCT/JP2011/007110 filed Dec. 20, 2011 which claims priority of JP 2011-002510 filed Jan. 7, 2011, the entire contents of each of which are hereby incorporated by reference in this application.

TECHNICAL FIELD

The present invention relates to a synthetic resin-made thrust sliding bearing, and more particularly to a thrust sliding bearing which is suitably incorporated as a thrust sliding bearing of a strut-type suspension (Macpherson type) in a four-wheeled motor vehicle, as well as a mounting structure of a strut-type suspension using the thrust sliding bearing.

BACKGROUND ART

In general, a strut-type suspension is mainly used for a front wheel of a four-wheeled motor vehicle, and has a construction in which a strut assembly incorporating a hydraulic shock absorber in an outer cylinder formed integrally with a main shaft is combined with a coil spring. Among such suspensions, (1) there is a type of structure in which the axis of the coil spring is actively offset with respect to the axis of the strut, so as to allow the sliding of a piston rod of the shock absorber incorporated in that strut to be effected smoothly, and (2) there is another type of structure in which the axis of the coil spring is arranged in alignment with the axis of the strut. In the suspension of either structure, a bearing is disposed between a mounting member for a motor vehicle body and an upper spring seat of the coil spring to allow the rotation to be effected smoothly when the strut assembly rotates together with the coil spring by the steering operation.

Further, this bearing is required to have a performance which supports the vehicle body load (thrust load) and concurrently smoothly allows for the radial load due to the above-described suspension structure, i.e., in the case of the former structure, the radial load produced by the restoring force of the coil spring in the axial direction of the strut even in a stationary state since the axis of the coil spring is offset with respect to the axis of the strut, and in the case of the latter structure, the radial load occurring due to misalignment attributable to the difficulty in fabrication that the axis of the strut and the axis of the coil spring must be arranged in alignment with each other.

PRIOR ART DOCUMENTS

Patent Documents

Patent Document 1: JP-A-2002-257146
Patent Document 2: JP-A-2004-225754

SUMMARY OF THE INVENTION

Problems that the Invention is to Solve

As a thrust sliding bearing which smoothly allows for the thrust load and radial load described above, a thrust sliding bearing has been proposed which is comprised of a synthetic resin-made lower casing, a synthetic resin-made upper casing superposed on this lower casing, a synthetic resin-made disk-shaped thrust sliding bearing piece interposed between the upper and lower casings, and a synthetic resin-made radial bearing piece interposed between the upper and lower casings (Patent Document 1 and Patent Document 2).

However, there are cases where it is impossible to secure a space for radially outward mounting between a vehicle body-side mounting member and an upper spring seat where the thrust sliding bearing is disposed. In addition, there is an economic problem in that an increase in cost is entailed as the two bearings, the thrust sliding bearing and the radial sliding bearing, are used.

The present invention has been devised in view of the above-described aspects, and its object is to provide a thrust sliding bearing which is capable of overcoming the problem of the mounting space and also overcoming the economic problem by making the radial dimension small by forming a radial sliding bearing portion within the upper and lower casings without using a radial sliding bearing.

Means for Solving the Problems

A thrust sliding bearing in accordance with the present invention comprises: a synthetic resin-made lower casing, a synthetic resin-made upper casing superposed on the lower casing, and a synthetic resin-made thrust sliding bearing piece interposed between the upper casing and the lower casing, wherein the lower casing includes an annular base portion which has an annular upper surface and an annular lower surface, as well as a tubular small-diameter inner surface, a tubular large-diameter inner surface, and a cylindrical outer surface which are arranged between the annular upper surface and the annular lower surface and has a first annular recessed portion provided on the annular upper surface; a small-diameter hole which is defined by the tubular small-diameter inner surface of the annular base portion and is open at the annular lower surface of the annular base portion; a large-diameter hole which is defined by the tubular large-diameter inner surface of the annular base portion and is open at the annular upper surface of the annular base portion; an annular shoulder surface which is continuous from the tubular small-diameter inner surface at its annular inner peripheral end and is continuous from the tubular large-diameter inner surface at its annular outer peripheral end; an annular projecting portion which projects radially outward from a lower end portion of the cylindrical outer surface; a tubular projecting portion which is provided on an annular upper surface of the annular projecting portion and defines a second annular recessed portion by its tubular inner surface in cooperation with the cylindrical outer surface and the annular upper surface of the annular projecting portion; and an annular engaging projecting portion which projects radially outward from a tubular outer surface of the tubular projecting portion, wherein the upper casing includes an annular baseplate portion; an inner tubular suspended portion which is integrally provided on a tubular inner surface of the annular baseplate portion in such a manner as to be suspended downward from an annular upper surface of the annular baseplate portion and defines a central hole concentric with the small-diameter hole by its tubular inner surface; a thick-walled outer tubular suspended portion which is integrally provided on a tubular outer surface of the annular baseplate portion in such a manner as to be suspended from the annular upper surface of the annular baseplate portion and to extend downwardly of an annular lower end surface of the inner tubular suspended portion, and which has a cylindrical inner surface; a third annular recessed portion which is defined by an annular lower surface of the annular baseplate portion, a tubular outer surface of the inner tubular suspended portion, and the cylindrical inner surface of the outer tubular suspended portion; an inner tubular vertical wall portion and an outer tubular vertical wall portion which are provided vertically downward from an annular lower end surface of the outer tubular suspended portion; a fourth annular recessed portion which is defined by the annular lower end surface of the outer tubular suspended portion, a tubular outer surface of the inner tubular vertical wall portion, and a tubular inner surface of the outer tubular vertical wall portion; an annular engaging portion which projects downward from an annular lower end surface of the outer tubular vertical wall portion; and an annular hook portion which projects radially inward from a tubular inner surface of the annular engaging portion, and wherein the thrust sliding bearing piece is disposed in the third annular recessed portion with its annular upper surface brought into slidable contact with the annular lower surface of the annular baseplate portion defining the third annular recessed portion, and is disposed in the first annular recessed portion with its annular lower surface brought into slidable contact with an annular recessed portion bottom surface of the annular base portion defining the first annular recessed portion, such that the annular lower surface of the annular baseplate portion of the upper casing and the annular upper surface of the annular base portion of the lower casing are spaced apart from each other, the upper casing being superposed on the lower casing, such that the annular lower end surface of its inner tubular suspended portion is opposed to the annular shoulder surface with a gap therebetween, the cylindrical inner surface of its outer tubular suspended portion having a greater wall thickness than the inner tubular suspended portion concerning a radial direction is brought into slidable contact with the cylindrical outer surface of the annular base portion of the lower casing, its inner tubular vertical wall portion is disposed in the second annular recessed portion, and its annular hook portion is resiliently fitted to the annular engaging projecting portion, whereby a sealing portion based on labyrinth action is formed between the resiliently fitted portion and the slidably contacting portion of the cylindrical outer surface of the annular base portion with respect to the cylindrical inner surface of the outer tubular suspended portion by the inner tubular vertical wall portion disposed in the second annular recessed portion and the tubular projecting portion and the annular engaging projecting portion disposed in the fourth annular recessed portion.

According to the thrust sliding bearing in accordance with the present invention, the relative rotation between the upper casing and the lower casing in the direction of the thrust load is allowed by the smooth sliding between the annular upper surface of the thrust sliding bearing piece disposed in the first and third annular recessed portions and the annular lower surface of the annular baseplate portion of the upper casing, whereas the relative rotation between the upper casing and the lower casing in the direction of the radial load is allowed by the smooth sliding between the cylindrical inner surface of the outer tubular suspended portion of the upper casing and the cylindrical outer surface of the annular base portion of the lower casing.

In addition, according to the thrust sliding bearing in accordance with the present invention, since the thrust sliding bearing portion, which is constituted by the annular upper surface of the thrust sliding bearing piece and the annular lower surface of the annular baseplate portion of the upper casing and allows smooth sliding in the relative rotation between the upper casing and the lower casing with respect to the direction of the thrust load, is located upwardly of the sealing portion based on the labyrinth action and the annular upper surface of the lower casing, it is possible to prevent as practically as possible the ingress of foreign objects such as dust from the inner and outer peripheral surface sides into that thrust sliding bearing portion, thereby making it possible to obviate trouble such as the abnormal wear of the thrust sliding bearing portion ascribable to the ingress of such foreign objects. Furthermore, the ingress of foreign objects such as dust from the outer peripheral surface side into the radial sliding bearing portion, which is constituted by the cylindrical inner surface of the outer tubular suspended portion of the upper casing and the cylindrical outer surface of the annular base portion of the lower casing and allows smooth sliding in the relative rotation between the upper casing and the lower casing with respect to the direction of the radial load, is prevented as practically as possible by the sealing portion based on the labyrinth action, thereby also making it possible to obviate trouble such as the abnormal wear of the radial sliding bearing portion ascribable to the ingress of such foreign objects.

In the thrust sliding bearing in accordance with the present invention, the synthetic resin for forming the thrust sliding bearing piece interposed between the upper casing and the lower casing should preferably have self-lubricity, in particular, whereas the synthetic resin for forming upper casing and the lower casing should preferably excel in mechanical properties, such as wear resistance, shock resistance, sliding properties including creep resistance, and rigidity. Specifically, the upper casing and the lower casing should preferably be formed of a thermoplastic synthetic resin such as polyacetal resin, polyamide resin, and polyester resin. Meanwhile, the thrust sliding bearing piece should preferably be formed of such as polyethylene resin, fluororesin, or the like.

A mounting structure for mounting to a vehicle body through the above-described thrust sliding bearing a strut-type suspension for a motor vehicle equipped with a hydraulic shock absorber and a coil spring disposed in such a manner as to surround the hydraulic shock absorber, comprises: mounting means for mounting a piston rod of the hydraulic shock absorber to the vehicle body and an upper spring receiving means for receiving the coil spring, the thrust sliding bearing being interposed between the mounting means and the upper spring receiving means, wherein the mounting means includes: a vehicle body mounting member having an annular flat portion fixed to a vehicle body side and a cylindrical projecting portion projecting downwardly from an annular inner edge of the annular flat portion and defining a through hole by its inner peripheral surface; and a mounting member having an annular flat portion formed integrally on a lower surface of the annular flat portion of the vehicle body mounting member, as well as a cylindrical suspended portion extending downwardly from an annular outer edge of the annular flat portion, wherein the upper spring receiving means is constituted by an upper spring receiving member having an annular flat portion and a cylindrical projecting portion which projects upwardly from an annular inner edge of the annular flat portion and defines a through hole by its inner peripheral surface, a lower end surface of the cylindrical projecting portion of the vehicle body mounting member and an upper end surface of the cylindrical projecting portion of the upper spring receiving member being arranged in such a manner as to oppose each other, and wherein the thrust sliding bearing is interposed in an annular space which is formed by the cylindrical projecting portion of the vehicle body mounting member, the annular flat portion of the mounting member, the cylindrical suspended portion of the mounting member, the annular flat portion of the upper spring receiving member, and the cylindrical projecting portion of the upper spring receiving member, such that the inner tubular suspended portion of the annular baseplate portion of the upper casing is brought into contact with an outer surface of the cylindrical projecting portion of the vehicle body mounting member, the annular upper surface of the annular baseplate portion of the upper casing is brought into contact with the annular flat portion of the mounting member, and an outer peripheral surface of the outer tubular suspended portion is surrounded by an inner surface of the cylindrical suspended portion of the mounting member, and such that the annular lower surface of the annular base portion of the lower casing is brought into contact with an upper surface of the flat portion of the upper spring receiving member, and the tubular small-diameter inner surface of the annular base portion of the lower casing is surrounded by an inner surface of the cylindrical projecting portion of the upper spring receiving member.

According to the mounting structure in accordance with the present invention, when the strut assembly is rotated by a steering operation, the lower casing is rotated with respect to the upper casing, and the rotation of this lower casing is smoothly allowed by the thrust sliding bearing piece interposed between the upper casing and the lower casing, thereby allowing the steering operation to be performed smoothly. In addition, when a radial load has been applied, the radial load is smoothly allowed by mutual sliding between the synthetic resins in the radial sliding bearing portion which is formed while holding a bearing clearance between the cylindrical inner surface of the outer tubular suspended portion of the annular baseplate portion of the upper casing and the cylindrical outer surface of the annular base portion of the lower casing and is constituted by that cylindrical inner surface and that cylindrical outer surface.

Advantages of the Invention

According to the present invention, it is possible to provide a low-cost thrust sliding bearing whose radial dimension can be made small by forming the radial sliding bearing portion between the upper and lower casings without using a radial sliding bearing, as well as a mounting structure of a strut-type suspension using this thrust sliding bearing.

MODE FOR CARRYING OUT THE INVENTION

Figure 1:
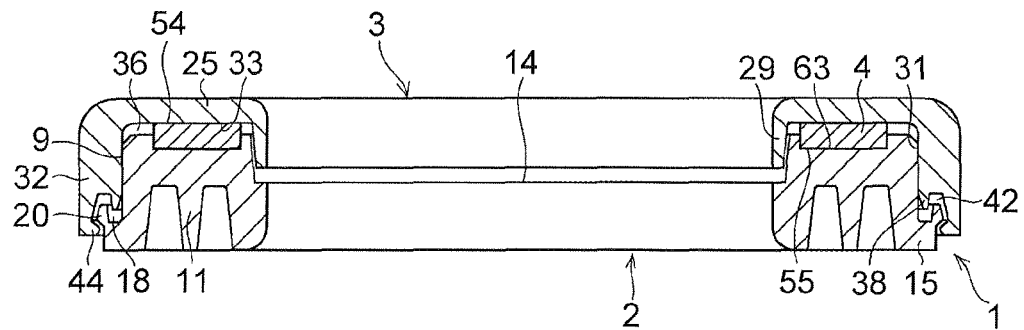
FIG. 1 is a cross-sectional view of a thrust sliding bearing in accordance with an embodiment of the present invention.
Figure 2:
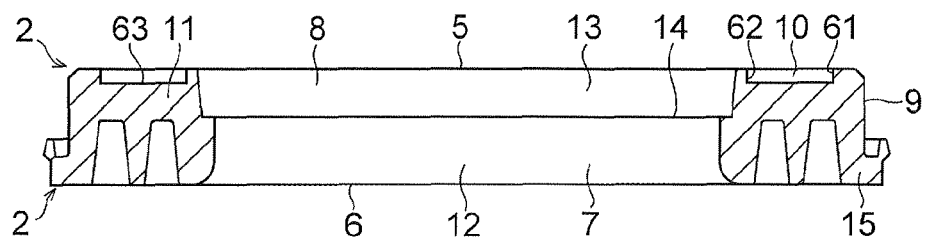
FIG. 2 is a cross-sectional view of a lower casing shown in FIG. 1.
Figure 3:
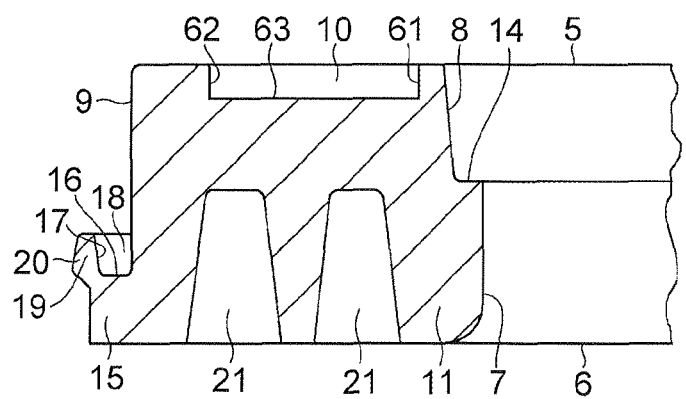
FIG. 3 is a partially enlarged cross-sectional view of the lower casing shown in FIG. 2.
Figure 4:
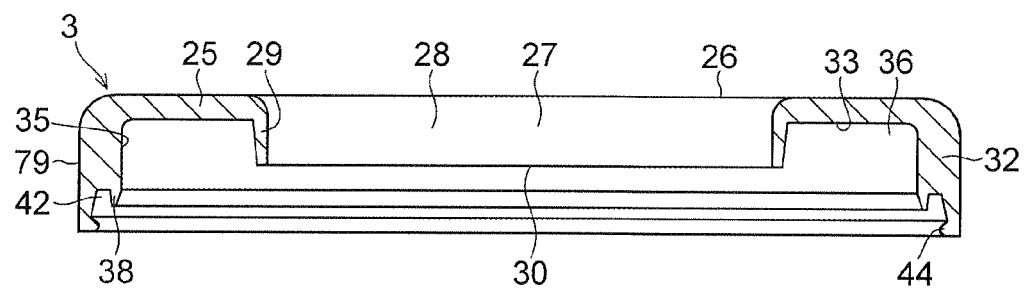
FIG. 4 is a cross-sectional view of an upper casing shown in FIG. 1.
Figure 5:
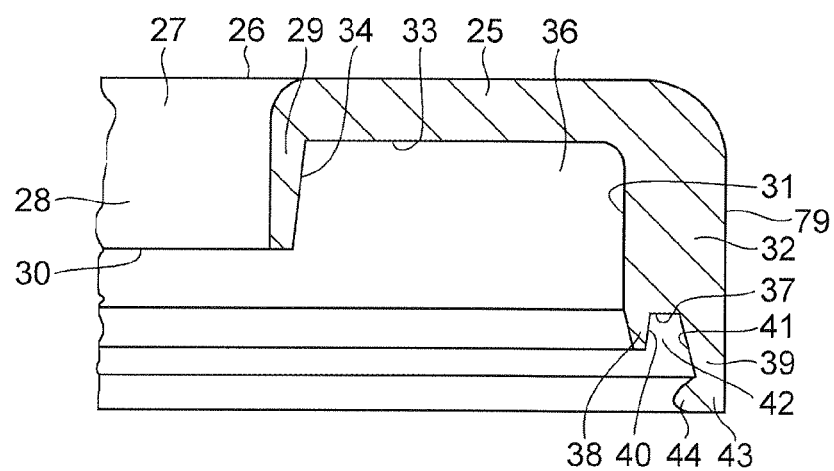
FIG. 5 is a partially enlarged cross-sectional view of the upper casing shown in FIG. 4.
Figure 6:
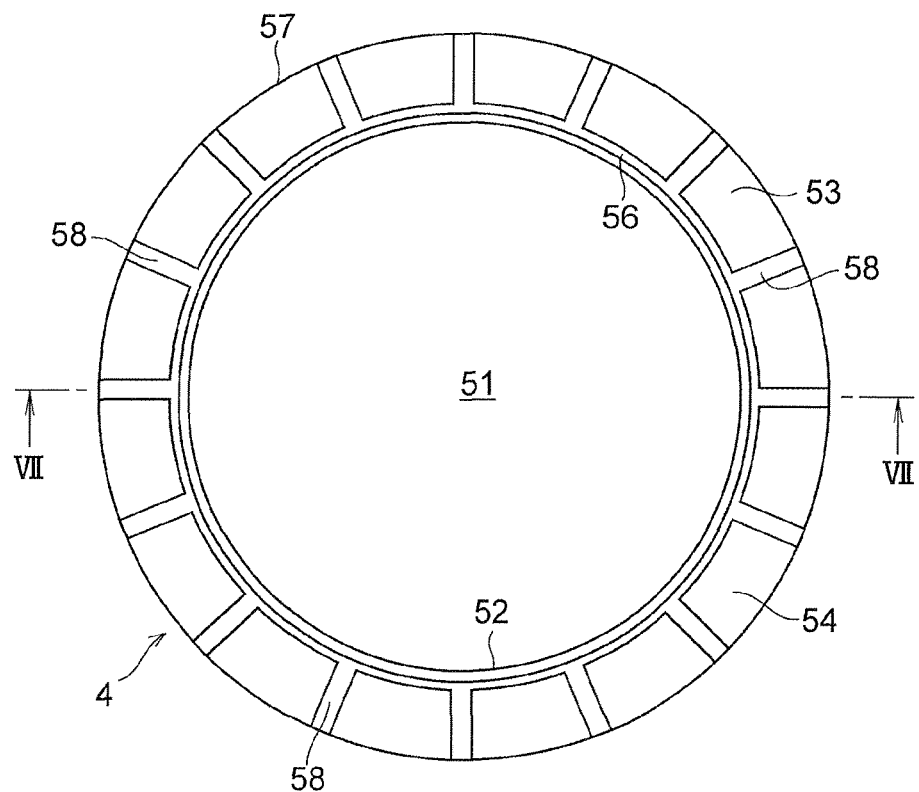
FIG. 6 is a plan view of a thrust sliding bearing piece shown in FIG. 1.
Figure 7:
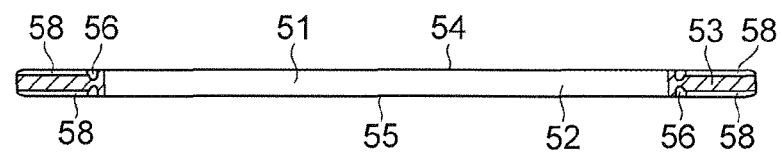
FIG. 7 is a cross-sectional view, taken in the direction of arrows VII-VII, of the thrust sliding bearing piece shown in FIG. 6.

Hereafter, a more detailed description will be given of the present invention with reference to preferred embodiments shown in the drawings. It should be noted that the present invention is not limited to these embodiments.

A thrust sliding bearing 1 in accordance with the present invention is comprised of a synthetic resin-made lower casing 2, a synthetic resin-made upper casing 3 superposed on the lower casing 2, and a synthetic resin-made thrust sliding bearing piece 4 interposed between the upper casing 3 and the lower casing 2.

The lower casing 2 includes an annular base portion 11 which has an annular upper surface 5 and an annular lower surface 6, as well as a tubular small-diameter inner surface 7, a tubular large-diameter inner surface 8, and a cylindrical outer surface 9 which are arranged between the annular upper surface 5 and the annular lower surface 6 and has a wide annular recessed portion 10 provided on the annular upper surface 5; a small-diameter hole 12 which is defined by the tubular small-diameter inner surface 7 of that annular base portion 11 and is open at the annular lower surface 6 of the annular base portion 11; a truncated cone-shaped large-diameter hole 13 which is defined by the truncated cone-shaped tubular large-diameter inner surface 8 which is gradually enlarged in diameter toward the annular upper surface 5 of the annular base portion 11 and is open at the annular upper surface 5 of the annular base portion 11; an annular shoulder surface which is continuous from the tubular small-diameter inner surface 7 at its annular inner peripheral end and is continuous from the tubular large-diameter inner surface 8 at its annular outer peripheral end; an annular projecting portion 15 which projects radially outward from a lower end portion of the cylindrical outer surface 9; a tubular projecting portion 19 which is provided on an annular upper surface 16 of that annular projecting portion 15 and defines an annular recessed portion 18 by its tubular inner surface 17 in cooperation with the cylindrical outer surface 9 and the annular upper surface 16 of the annular projecting portion 15; an annular engaging projecting portion 20 which projects radially outward from a tubular outer surface of the tubular projecting portion 19; and two wall thickness-reducing annular recessed portions 21 which are formed in the annular lower surface 6 of the annular base portion 11 in such a manner as to extend from the annular lower surface 6 toward the annular upper surface 5 side and to surround the small-diameter hole 12, so as to make the wall thickness of the annular base portion 11 uniform.

The upper casing 3 includes an annular baseplate portion 25; an inner tubular suspended portion 29 which is integrally provided on a tubular inner surface of the annular baseplate portion 25 in such a manner as to be suspended downward from an annular upper surface 26 of that annular baseplate portion 25 and defines a central hole 28 concentric with the small-diameter hole 12 by its tubular inner surface 27; a thick-walled outer tubular suspended portion 32 which is integrally provided on a tubular outer surface of the annular baseplate portion 25 in such a manner as to be suspended from the annular upper surface 26 of the annular baseplate portion 25 and to extend downwardly of an annular lower end surface 30 of the inner tubular suspended portion 29, and which has a cylindrical inner surface 31; an annular recessed portion 36 which is defined by an annular lower surface 33 of the annular baseplate portion 25, a tubular outer surface 34 constituted by a truncated cone-shaped surface of the inner tubular suspended portion 29, and the cylindrical inner surface 31 of the outer tubular suspended portion 32; an inner tubular vertical wall portion 38 and an outer tubular vertical wall portion 39 which are provided vertically downward from an annular lower end surface 37 of the outer tubular suspended portion 32; an annular recessed portion 42 which is defined by the annular lower end surface 37 of the outer tubular suspended portion 32, a tubular outer surface 40 of the inner tubular vertical wall portion 38, and a tubular inner surface 41 of the outer tubular vertical wall portion 39; an annular engaging portion 43 which projects downward from an annular lower end surface of the outer tubular vertical wall portion 39; and an annular hook portion 44 which projects radially inward from a tubular inner surface of the annular engaging portion 43.

As for the outer tubular suspended portion 32 having the cylindrical inner surface 31 for forming the radial sliding bearing portion together with the cylindrical outer surface 9 of the lower casing 2, its wall thickness is formed to be greater than the wall thickness of the inner tubular suspended portion 29 in order to enhance the strength with respect to the radial load.

The thrust sliding bearing piece 4 includes an annular plate-like portion 53 having a cylindrical inner surface 52 defining a central hole 51; a pair of annular recessed grooves 56 which are adapted to accommodate a lubricant such as grease and are respectively formed on an annular upper surface 54 and an annular lower surface 55 of the annular plate-like portion 53 and surround the central hole 51; and a plurality of radial recessed grooves 58 which are adapted to accommodate a lubricant such as grease and are formed on the annular upper surface 54 and the annular lower surface 55 of the annular plate-like portion 53, with one ends thereof being open to the annular recessed groove 56 and other ends thereof being open to the outside at a cylindrical outer surface 57 of the annular plate-like portion 53.

The cylindrical inner surface 52 defining the central hole 51 of the thrust sliding bearing piece 4 has a greater inside diameter dimension than the outside diameter dimension of an annular inner vertical wall surface 61 of the annular base portion 11 defining the annular recessed portion 10, whereas the cylindrical outer surface 57 of the thrust sliding bearing piece 4 has a smaller outside diameter dimension than the inside diameter dimension of an annular outer vertical wall surface 62 of the annular base portion 11 defining the annular recessed portion 10. A lubricant such as grease is filled in the annular recessed grooves 56 and the radial recessed grooves 58 formed on the annular upper surface 54 and the annular lower surface 55 of the annular plate-like portion 53.

The thrust sliding bearing piece 4 is disposed in the annular recessed portion 36 with its annular upper surface 54 brought into slidable contact with the annular lower surface 33 of the annular baseplate portion 25 defining the annular recessed portion 36, and is disposed in the annular recessed portion 10 with its annular lower surface 55 brought into slidable contact with an annular recessed portion bottom surface 63 of the annular base portion 11 defining the annular recessed portion 10 in cooperation with the annular inner vertical wall surface 61 and the annular outer vertical wall surface 62, such that the annular lower surface 33 of the annular baseplate portion 25 of the upper casing 3 and the annular upper surface 5 of the annular base portion 11 of the lower casing 2 are spaced apart from each other. Thus, the annular upper surface 54 of the annular plate-like portion 53 is located upwardly of the opening plane of the wide annular recessed portion 10.

With the thrust sliding bearing 1 having the above-described construction, the upper casing 3 is superposed on the lower casing 2, such that the tubular outer surface 34 of the inner tubular suspended portion 29 of the annular baseplate portion 25 is opposed to the tubular large-diameter inner surface 8 of the annular base portion 11 of the lower casing 2 with a gap therebetween, while the annular lower end surface 30 of the inner tubular suspended portion 29 is opposed to the annular shoulder surface 14 of the annular base portion 11 of the lower casing 2 with a gap therebetween, the cylindrical inner surface 31 of the outer tubular suspended portion 32 having a greater wall thickness than the inner tubular suspended portion 29 concerning the radial direction is brought into slidable contact with the cylindrical outer surface 9 of the annular base portion 11 of the lower casing 2, the inner tubular vertical wall portion 38 is disposed in the annular recessed portion 18, and the annular hook portion 44 is resiliently fitted to the annular engaging projecting portion 20, whereby a sealing portion based on labyrinth action is formed between the resiliently fitted portion and the slidably contacting portion of the cylindrical outer surface 9 of the annular base portion 11 with respect to the cylindrical inner surface 31 of the outer tubular suspended portion 32 by the inner tubular vertical wall portion 38 disposed in the annular recessed portion 18 and the tubular projecting portion 19 and the annular engaging projecting portion 20 disposed in the annular recessed portion 42.

According to the thrust sliding bearing 1, the relative rotation between the upper casing 3 and the lower casing 2 in the direction of the thrust load is allowed by the smooth sliding of the thrust sliding bearing involving, on the one hand, the annular upper surface 54 of the thrust sliding bearing piece 4 disposed in the annular recessed portions 10 and 36 and, on the other hand, the annular lower surface 33 of the annular baseplate portion 25 of the upper casing 3, whereas the relative rotation between the upper casing 3 and the lower casing 2 in the direction of the radial load is allowed by the smooth sliding of the radial sliding bearing portion involving, on the one hand, the cylindrical inner surface 35 of the outer tubular suspended portion 32 of the upper casing 3 and, on the other hand, the cylindrical outer surface 9 of the annular base portion 11 of the lower casing 2.

In addition, with the thrust sliding bearing 1, since the thrust sliding bearing portion, which is constituted by the annular upper surface 54 of the thrust sliding bearing piece 4 and the annular lower surface 33 of the annular baseplate portion 25 of the upper casing 3 and allows smooth sliding in the relative rotation between the upper casing 3 and the lower casing 2 with respect to the direction of the thrust load, is located upwardly of the sealing portion based on the labyrinth action and the annular upper surface 5 of the lower casing 2, it is possible to prevent as practically as possible the ingress of foreign objects such as dust from the inner and outer peripheral surface sides of the thrust sliding bearing 1 into that thrust sliding bearing portion, thereby making it possible to obviate trouble such as the abnormal wear of the thrust sliding bearing portion ascribable to the ingress of such foreign objects. Furthermore, the ingress of foreign objects such as dust from the outer peripheral surface side of the thrust sliding bearing 1 into the radial sliding bearing portion, which is constituted by the cylindrical inner surface 31 of the outer tubular suspended portion 32 of the upper casing 3 and the cylindrical outer surface 9 of the annular base portion 11 of the lower casing 2 and allows smooth sliding in the relative rotation between the upper casing 3 and the lower casing 2 with respect to the direction of the radial load, is prevented as practically as possible by the sealing portion based on the labyrinth action, thereby also making it possible to obviate trouble such as the abnormal wear of the radial sliding bearing portion ascribable to the ingress of the foreign objects.

Figure 8:
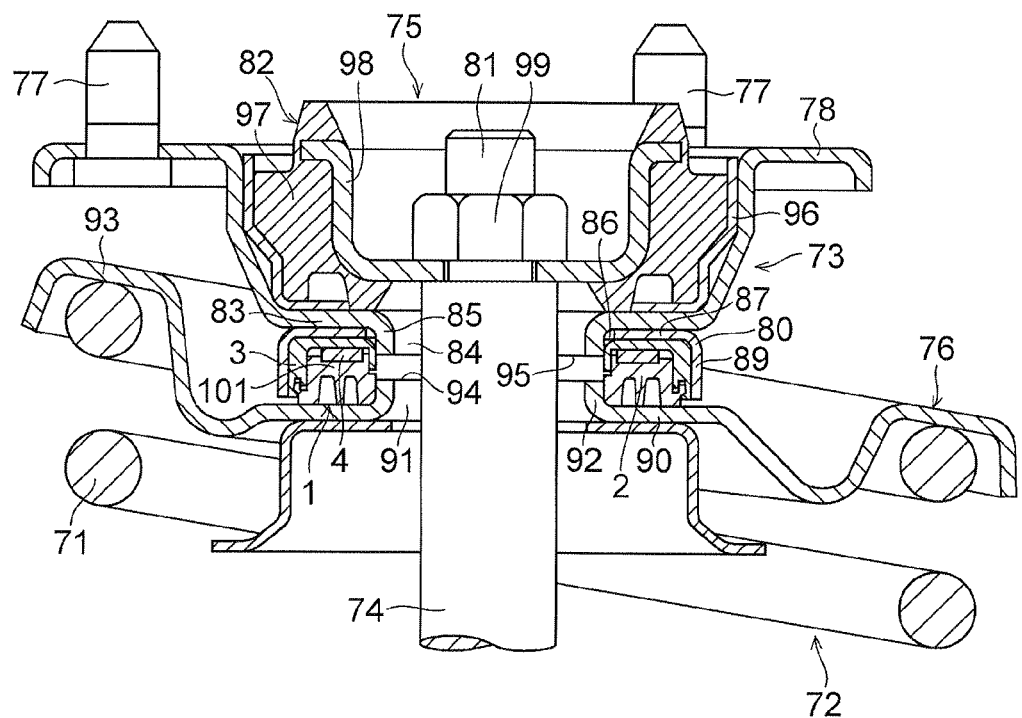
FIG. 8 is a cross-sectional view of a mounting structure of a strut-type suspension in accordance with a preferred embodiment of the present invention using the thrust sliding bearing piece shown in FIG. 1.

A strut-type suspension 72 for a motor vehicle, which is equipped with a hydraulic shock absorber (not shown) and a coil spring 71 disposed in such a manner as to surround the hydraulic shock absorber, is mounted to a vehicle body through the above-described thrust sliding bearing 1 by means of a mounting structure 73, as shown in FIG. 8.

The mounting structure 73 for mounting the strut-type suspension 72 to the vehicle body through the thrust sliding bearing 1 includes a mounting means 75 for mounting a piston rod 74 of the hydraulic shock absorber to the vehicle body as well as an upper spring receiving means 76 for receiving the coil spring 71, and the thrust sliding bearing 1 is interposed between the mounting means 75 and the upper spring receiving means 76.

The mounting means 75 includes a vehicle body mounting member 78 which is secured to the vehicle body through bolts 77; a mounting member 80 which is integrally coupled to that vehicle body mounting member 78 and surrounds the annular upper surface 26 of the annular baseplate portion 25 and a cylindrical outer surface 79 of the outer tubular suspended portion 32 of the upper casing 3 of the thrust sliding bearing 1; and a coupling and fixing means 82 for coupling and fixing an upper end portion 81 of the piston rod 74 of the hydraulic shock absorber to the vehicle body mounting member 78.

The vehicle body mounting member 78 includes an annular flat portion 83 which is fixed to the vehicle body side and a cylindrical projecting portion 85 which integrally projects downwardly from an annular inner edge of that annular flat portion 83 and defines a through hole 84 by its inner peripheral surface.

The mounting member 80 includes an annular flat portion 87 having a through hole 86 and formed integrally on a lower surface of the annular flat portion 83 of the vehicle body mounting member 78, as well as a cylindrical suspended portion 89 which integrally extends downwardly from an annular outer peripheral edge of that annular flat portion 87. This mounting member 80 is integrally coupled to the vehicle body mounting member 78 such that the annular flat portion 87 is fitted over an outer peripheral surface of the cylindrical projecting portion 85 of the vehicle body mounting member 78 through the through hole 86, and such that the annular flat portion 87 is joined to the lower surface of the annular flat portion 83 of the vehicle body mounting member 78.

The upper spring receiving means 76 is constituted by an upper spring receiving member 93 which includes an annular flat portion 90 and a cylindrical projecting portion 92 which integrally projects upwardly from an annular inner edge of the annular flat portion 90 and defines a through hole 91 by its inner peripheral surface. An upper end surface 94 of the cylindrical projecting portion 92 of the upper spring receiving member 93 is arranged in such a manner as to oppose a lower end surface 95 of the cylindrical projecting portion 85 of the vehicle body mounting member 78.

The coupling and fixing means 82 includes an outer coupling member 96 which is fitted and secured at its outer surface to an inner surface of the vehicle body mounting member 78; an annular elastic rubber body 97 bonded to the outer coupling member 96; an inner coupling member 98 bonded to the annular elastic rubber body 97; and a nut 99 which is threadedly secured to the upper end portion 81 of the piston rod 74 while clamping an inner edge portion of the inner coupling member 98 together with the upper end portion 81.

The thrust sliding bearing 1 is interposed between the vehicle body mounting member 78 and the upper spring receiving member 93, i.e., in an annular space 101 which is formed by the inner surface of the cylindrical projecting portion 85 of the vehicle body mounting member 78, the lower surface of the annular flat portion 87 of the mounting member 80, the inner surface of the cylindrical suspended portion 89, the upper surface of the annular flat portion 90 of the upper spring receiving member 93, and the outer surface of the cylindrical projecting portion 92 of the upper spring receiving member 93, such that the tubular inner surface 27 of the inner tubular suspended portion 29 of the annular baseplate portion 25 of the upper casing 3 is brought into contact with the outer surface of the cylindrical projecting portion 85 of the vehicle body mounting member 78, the annular upper surface 26 of the annular baseplate portion 25 of the upper casing 3 is brought into contact with the lower surface of the annular flat portion 87 of the mounting member 80, and the cylindrical outer surface 79 of the outer tubular suspended portion 32 is surrounded by the inner surface of the cylindrical suspended portion 89 of the mounting member 80 in such a manner as to be in contact with the inner surface of that cylindrical suspended portion 89, and such that the annular lower surface 6 of the annular base portion 11 of the lower casing 2 is brought into contact with the upper surface of the flat portion 90 of the upper spring receiving member 93, and the tubular small-diameter inner surface 7 of the annular base portion 11 of the lower casing 2 is surrounded by the inner surface of the cylindrical projecting portion 92 of the upper spring receiving member 93 in such a manner as to be in contact with the inner surface of that cylindrical projecting portion 92.

According to the mounting structure 73, when the upper spring receiving means 76 is rotated with respect to the mounting means 75 by a steering operation, the lower casing 2 is rotated with respect to the upper casing 3, and the rotation of this lower casing 2 is smoothly allowed by the thrust sliding bearing piece 4 interposed between the upper casing 3 and the lower casing 2, thereby allowing the steering operation to be performed smoothly. In addition, when a radial load has been applied, the radial load is smoothly allowed by mutual sliding between the synthetic resins in the radial sliding bearing portion formed while holding a bearing clearance between the cylindrical inner surface 31 of the outer tubular suspended portion 32 of the annular baseplate portion 25 of the upper casing 3 and the cylindrical outer surface 9 of the annular base portion 11 of the lower casing 2.

In addition, as for the mounting structure 73 as well, since the thrust sliding bearing portion in the thrust sliding bearing 1 disposed in the annular space 101 is located upwardly of the annular upper surface 5 and the sealing portion based on the labyrinth action, it is possible to prevent as practically as possible the ingress of foreign objects such as dust from the inner and outer peripheral surface sides of the thrust sliding bearing 1 into that thrust sliding bearing portion, thereby making it possible to obviate trouble such as the abnormal wear of the thrust sliding bearing portion ascribable to the ingress of the foreign objects. Furthermore, the ingress of foreign objects such as dust from the outer peripheral surface side of the thrust sliding bearing 1 into the radial sliding bearing portion, which is constituted by the cylindrical inner surface 31 of the outer tubular suspended portion 32 of the upper casing 3 and the cylindrical outer surface 9 of the annular base portion 11 of the lower casing 2 and allows smooth sliding in the relative rotation between the upper casing 3 and the lower casing 2 with respect to the direction of the radial load, is prevented as practically as possible by the sealing portion based on the labyrinth action, thereby also making it possible to obviate trouble such as the abnormal wear of the radial sliding bearing portion ascribable to the ingress of such foreign objects.

DESCRIPTION OF REFERENCE NUMERALS

1: thrust sliding bearing
2: lower casing
3: upper casing
4: thrust sliding bearing piece

The invention claimed is:

1. A mounting structure for mounting to a vehicle body through a thrust sliding bearing a strut-type suspension for a motor vehicle equipped with a hydraulic shock absorber and a coil spring disposed in such a manner as to surround the hydraulic shock absorber, comprising: mounting means for mounting a piston rod of the hydraulic shock absorber to the vehicle body and an upper spring receiving means for receiving the coil spring, the thrust sliding bearing being interposed between said mounting means and said upper spring receiving means, wherein said mounting means includes:

a vehicle body mounting member having a first annular flat portion fixed to a vehicle body side and a cylindrical projecting portion projecting downwardly from an annular inner edge of the first annular flat portion and defining a through hole by its inner peripheral surface; and a mounting member having a second annular flat portion formed integrally on a lower surface of the first annular flat portion of the vehicle body mounting member, as well as a cylindrical suspended portion extending downwardly from an annular outer edge of the second annular flat portion, wherein said upper spring receiving means is constituted by an upper spring receiving member having a third annular flat portion and a cylindrical projecting portion which projects upwardly from an annular inner edge of the third annular flat portion and defines a through hole by its inner peripheral surface, wherein said thrust sliding bearing is interposed in an annular space which is formed by the cylindrical projecting portion of the vehicle body mounting member, the second annular flat portion of the mounting member, the cylindrical suspended portion of the mounting member, the third annular flat portion of the upper spring receiving member, and the cylindrical projecting portion of the upper spring receiving member, wherein said thrust sliding bearing comprises: a synthetic resin-made lower casing, a synthetic resin-made upper casing superposed on said lower casing, and a synthetic resin-made thrust sliding bearing piece interposed between said upper casing and said lower casing, wherein said lower casing includes an annular base portion which has an annular upper surface, an annular lower surface and a cylindrical outer surface, and has a first annular recessed portion provided on the annular upper surface; an annular projecting portion which projects radially outward from a lower end portion of the cylindrical outer surface of the lower casing; and a tubular projecting portion which is provided on an annular upper surface of the annular projecting portion and defines a second annular recessed portion by a tubular inner surface thereof in cooperation with the cylindrical outer surface of the lower casing and the annular upper surface of the annular projecting portion, wherein said upper casing includes an annular baseplate portion; an inner tubular suspended portion which is integrally provided on the annular baseplate portion in such a manner as to be suspended downward from the annular baseplate portion; and an outer tubular suspended portion which is integrally provided on the annular baseplate portion in such a manner as to be suspended from the annular baseplate portion, and wherein said thrust sliding bearing piece brings an annular upper surface thereof into slidable contact with the annular lower surface of the annular baseplate portion, and is disposed in the first annular recessed portion with an annular lower surface thereof brought into slidable contact with an annular recessed portion bottom surface of the annular base portion defining the first annular recessed portion, said upper casing being superposed on said lower casing, such that an cylindrical inner surface of the outer tubular suspended portion having a greater wall thickness than the inner tubular suspended portion concerning a radial direction is brought into slidable contact with the cylindrical outer surface of the annular base portion of said lower casing.

* * * * *